United States Patent [19]
Phares

[11] Patent Number: 5,815,141
[45] Date of Patent: Sep. 29, 1998

[54] RESISTIVE TOUCHSCREEN HAVING MULTIPLE SELECTABLE REGIONS FOR PRESSURE DISCRIMINATION

[75] Inventor: Robert Phares, Knoxville, Tenn.

[73] Assignee: Elo Touch Systems, Inc., Fremont, Calif.

[21] Appl. No.: 631,065

[22] Filed: Apr. 12, 1996

[51] Int. Cl.[6] .............................. G09G 3/02; G08C 21/00
[52] U.S. Cl. ..................... 345/173; 345/174; 345/179; 178/18; 178/19
[58] Field of Search .................. 178/18, 19, 20; 345/173, 174, 179

[56] References Cited

U.S. PATENT DOCUMENTS

| | | | |
|---|---|---|---|
| 3,911,215 | 10/1975 | Hurst et al. ................................. | 178/18 |
| 4,220,815 | 9/1980 | Gibson et al. ............................. | 178/18 |
| 4,622,437 | 11/1986 | Bloom et al. .............................. | 178/18 |
| 4,661,655 | 4/1987 | Gibson et al. ............................. | 178/18 |
| 4,686,332 | 8/1987 | Greanias et al. ......................... | 345/173 |
| 4,731,508 | 3/1988 | Gibson et al. ............................. | 178/18 |
| 4,797,514 | 1/1989 | Talmage, Jr. et al. .................... | 178/18 |
| 4,801,771 | 1/1989 | Mizuguchi et al. .................. | 200/86 R |
| 4,822,957 | 4/1989 | Talmage, Jr. et al. .................... | 178/18 |
| 5,220,136 | 6/1993 | Kent ........................................... | 178/18 |
| 5,402,151 | 3/1995 | Duwaer .................................... | 345/174 |
| 5,466,895 | 11/1995 | Logan ........................................ | 178/19 |
| 5,579,036 | 11/1996 | Yates, IV ................................. | 345/173 |

Primary Examiner—Steven Saras
Assistant Examiner—Vijay Shankar
Attorney, Agent, or Firm—Pitts & Brittian, P.C.

[57] ABSTRACT

A resistive two sheet touchscreen that provides discrimination between objects touching the surface thereof. This is achieved by subdividing at least one sheet into a selected number of separated portions of selected configuration. Each of these portions is connected through a switch apparatus to circuitry for evaluating a signal on the separated portions corresponding to the position of touch. This switch can be utilized to deactivate any selected portion so that an object contacting this portion provides no signal to the circuitry. Any active portion that remains connected to the circuitry provides position information as with any touchscreen. Accordingly, for example, the touchscreen can be made insensitive to portions of a hand, while being sensitive to a stylus held by that hand. An embodiment utilizing a single resistive layer coupled with a conductive layer is described together with an embodiment utilizing two resistive layers, are described.

20 Claims, 5 Drawing Sheets

RESISTIVE TOUCHSCREEN HAVING MULTIPLE SELECTABLE REGIONS FOR PRESSURE DISCRIMINATION

TECHNICAL FIELD

The present invention relates generally to devices for providing information as to a location of a point in a two-directional array of information, and more particularly to an improved resistive touchscreen that permits a selection of areas of activation of the touchscreen whereby pressure discrimination between areas of touch against the touchscreen can be achieved.

BACKGROUND ART

Many types of devices have been developed to provide information as to a location within a two-directional array of information. One simple device is a "touchscreen" having a pair of overlaid electrically conductive sheets that are subdivided so as to form a multiplicity of switches. With such a device, the touch of one of the switches causes some activation that is related to the position of the touched switch. Within each switch area, there is no discrimination of the actual point of touch.

More complex devices provide true information as to a location in a two-dimensional array of information. Such devices have been designated the terminology "touchscreens". Within this general designation, there are a multitude of types of devices for providing the positional information. Generally most fall within the category of "resistive" touchscreens where at least one of a pair of closely overlaid electrically conductive sheets has a substantially uniform resistivity throughout. In one class of resistive touchscreens, both of the sheets have this resistivity characteristic and each sheet is sequentially electrically energized to have a locus of equipotential points, or equipotential lines on the resistive surface such that the lines in one layer are straight, and substantially orthogonal to those in the other. Where only one sheet is resistive, the equipotential lines are created by sequentially applying orthogonal voltages to edges of the resistive layer. In the single-layer resistive touchscreens, the second sheet is conductive and is separated from the resistive layer so that the conductive sheet has voltages thereon only when it is touched to the resistive layer. These voltages provide the two coordinates for ascertaining the position of the contact.

Variations on resistive touchscreens have also included devices which added one or more separate non-position discriminating switches outside the viewable area of the touchscreen which would normally be associated with the video display viewed through the touchscreen or with the main target area of the system, in a non-video based application. Also, it is possible to greatly enlarge the sensitive area of the touchscreen such that additional target areas, typically associated with non-position discriminating switches, are defined outside the video display or main target viewing area, with the additional target area being defined for the user by graphics printed or embossed on the outer surface of the top conductive sheet, or by printed graphics viewed through the touchscreen. While these target areas are inherently position discriminating by virtue of being composed of a region of the touchscreen, their association with some specific system function, performed by system software, is a one-to-one association that causes the indicated function to be performed regardless of the specific location touched within the target area. Thus, these additional target areas are not intended for, and are not capable of, position discrimination.

It is normally desirable to prevent inadvertent touching of the two sheets that might occur because of gravity, curvature of the device, atmospheric conditions, etc. Toward this end it is conventional to separate the two sheets with small dots or islands of insulative material. These can be applied to the opposed faces of either or both of the layers. Then, because there has been a desire to differentiate between the size of the object touching the touchscreen, or to create a minimum activation force, specific spacing requirements have been applied for these islands of insulative material.

Several United States patents discuss the touchscreens of the prior art, and especially the specific spacing of islands of insulative material. Typical of such touchscreens are described in U.S. Pat. Nos. 3,911,215 issued to G. S. Hurst et al on Oct. 7, 1975; 4,220,815 issued to W. A. Gibson et al on Sep. 1, 1980; 4,661,655 issued to W. A. Gibson et al on Apr. 28, 1987; 4,731,508 issued to W. A. Gibson et al on Mar. 15, 1988; 4,797,514 issued to J. E. Talmage, Jr. et al on Jun. 10, 1989; 4,822,957 issued to J. E. Talmage, Jr. on Apr. 18, 1989; 4,801,773 issued to M. Mizuguchi et al on Jan. 31, 1989; and 5,220,136 issued to J. C. Kent on Jun. 15, 1993. These patents are incorporated herein by reference as to any teaching that is pertinent to the present invention. Specifically, the '215, '655, '508, '514 and '957 patents teach various systems for energizing the resistive layer of each device. All of the cited patents, except the '773 patent, are assigned to Elographics, Inc., a predecessor to the assignee of the present invention.

As taught in the cited patents, and particularly '215 and '136, the spacing between the insulating islands can be chosen by specific relationships to discriminate between touch objects of differing size. For example, it is often desired to differentiate between the touch of a sharp stylus and a finger tip. In other applications, it may be discrimination between a finger tip and a hand palm, for example. To prevent activation by a hand palm (or the edge of the hand) when it is desired to activate the touchscreen by an object of smaller size, a closer spacing of the insulating islands is utilized. Thus, the contact of the smaller-sized object is detected without activation by the larger object. However, when the touchscreen is to be utilized for writing or similar applications, in addition to "point and shoot" operation that might reasonably be accomplished entirely with a finger tip, the close spacing causes problems as the writing instrument encounters several positions of the insulating islands. Accordingly, this disadvantage of writing upon touchscreens having closely spaced insulative islands must be tolerated or a compromise between partial discrimination and substantially uninterrupted writing is chosen.

Accordingly, it is one object of the present invention to provide a resistive touchscreen wherein relatively widely spaced insulative separative islands can be utilized for enhanced writing capabilities while retaining a discrimination against objects having a size greater than that used for the writing—specifically against larger objects such as the palm of a writer using the touchscreen.

Another object of the present invention is to provide a resistive touchscreen therein a conductive layer overlaying a resistive layer is divided into discrete regions while retaining a desired sensitivity at any position on the touchscreen.

A further object of the present invention is to provide a resistive touchscreen wherein a conductive layer overlaying a resistive layer is divided into discrete regions, with each discrete region being selectively connected into detection equipment so that regions where no response is desired can be isolated while leaving the remainder of the touchscreen operable for position determinations and/or an annotation or drawing.

These and other objects of the present invention will become apparent upon a consideration of the drawings referred to hereinafter and their complete description.

SUMMARY OF THE INVENTION

In accordance with the present invention, there is provided a resistive touchscreen having multiple selectable sensitive regions for pressure discrimination. This is achieved in one embodiment by dividing a conductive cover sheet of a resistive touchscreen into electrically-isolated regions. In another embodiment which utilizes two resistive sheets, at least one of the resistive sheets is subdivided into isolatable regions. The entire touchscreens can be utilized as a single sensitive region, or at least one of the separate regions can be made sensitive and other regions made insensitive through the utilization of switching means. Thus, one or more regions can be made insensitive to provide palm rejection or other pressure discrimination when activation is desired only in the selected region of the touchscreen.

BEST MODE FOR CARRYING OUT THE INVENTION

Figure 1:
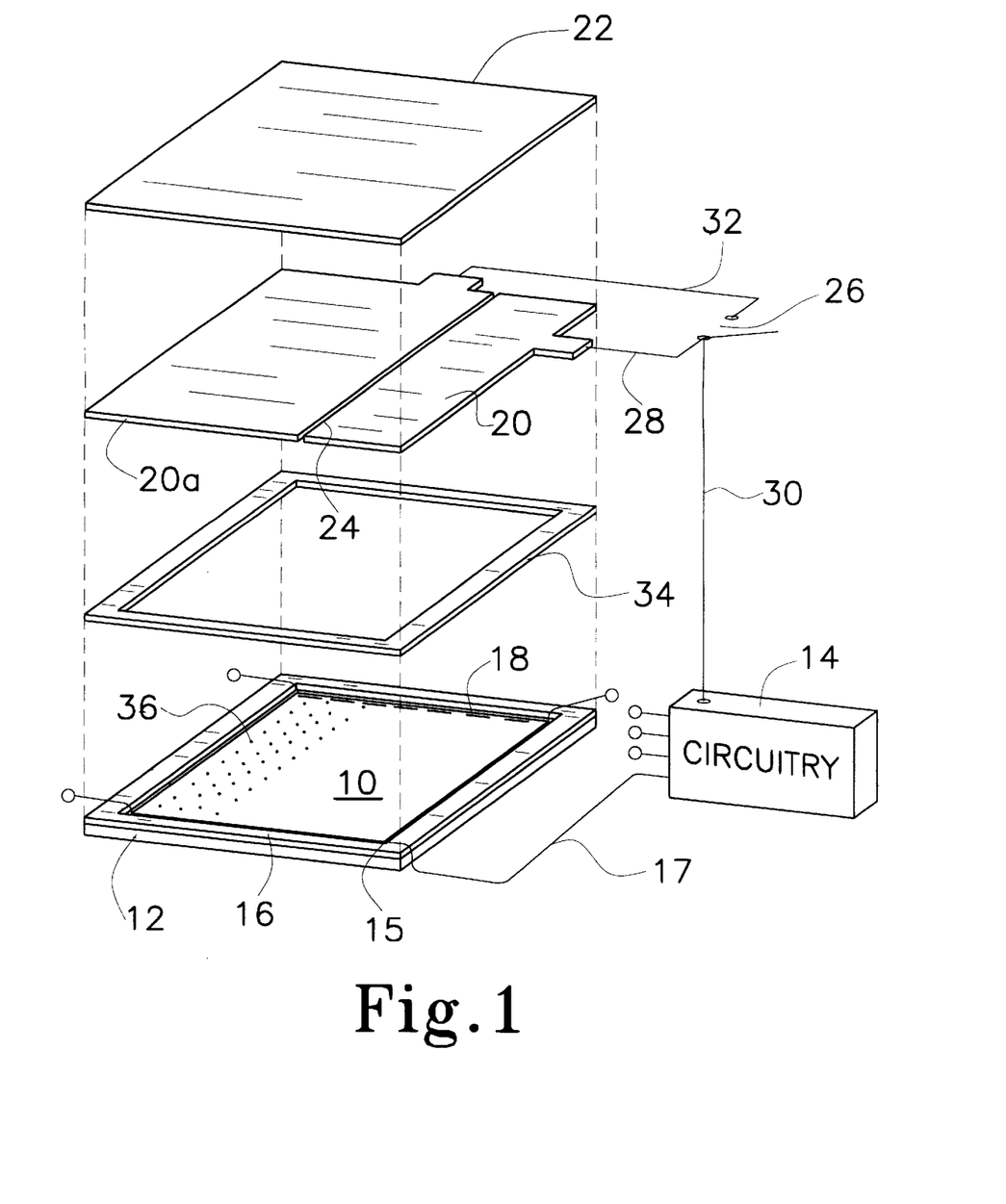
FIG. 1 is an exploded view of a resistive touchscreen illustrating the present invention including a schematic diagram for its use.

Referring now to FIG. 1, shown therein is an exploded view of one embodiment of a device for accomplishing the above-stated objects. It will be recognized that the thickness (or height) of the components has been exaggerated for purposes of illustration.

A uniform resistive surface or layer 10 is applied to a suitable substrate 12. Of course if the resistive surface 10 has sufficient rigidity, no separate substrate 12 will be required. The substrate 12 may be, for example, planar as shown. Further, the substrate 12 can be contoured as illustrated in U.S. Pat. No. 4,220,815 so as to conform to the face of a curved object such as a conventional video display screen. The substrate 12 can have any selected perimeter configuration, e.g., rectangular as shown, a configuration to match the configuration of a video display, etc.

Orthogonal electrical fields are created within the resistive layer 10 using a voltage source within the circuitry 14 and applying the voltage across the resistive layer in the two directions in separate time periods. This application of voltage is achieved through the use of a resistor string or resistor element 16 to which a plurality of electrodes 18 are attached at selected intervals (see FIGS. 4 and 4A). Corner junctions 15 of the resistor-electrode array 16 are joined to the circuitry 14 by leads 17. Any one of several resistor-electrode combinations 16/18 can be utilized. Typical of such combinations are those of U.S. Pat. Nos. 3,911,215, 4,661,655, 4,731,508, 4,797,514, and 4,822,957. In addition, potentials can be introduced into the resistive layer 10 by diode strings as is known in the art.

It is not necessary for purposes of the present invention that the fields be orthogonal. However, this is the most common type of resistive touchscreen. Spaced above the resistive layer 10 is a conductive layer which, in accordance with the present invention has at least two conductive portions 20, 20A in this embodiment (see also FIGS. 2 and 3 for other typical embodiments). These two conductive portions are conventionally applied on the undersurface of an insulative cover layer 22. These portions are separated by a very narrow insulative band 24. Conductive portion 20 is connected to a switch means 26 by lead 28, and then to the circuitry 14 with lead 30. It will be understood that although the switch means 26 has been illustrated as a mechanical switch, any form of switching means can be utilized with the present invention.

As illustrated for this embodiment of FIG. 1, the conductive portion 20 is always connected to the circuitry 14 through the switch means 26. Of course, it will be understood that this connection can be selected through a contact within the switch means 26 so as to disconnect portion 20 from the circuitry 14.

The conductive portion 20A is connected to a normally open contact of the switch means 26 by lead 32. With this connection, conductive portion 20A is only connected to the circuitry 14 when the switch means 26 is closed. The effect of this selective operation of switch means 26 will be discussed in detail hereinafter.

The conductive portions 20, 20A are separated from unintentional contact with the resistive layer 10 using, for example, a perimeter spacer 34. They are further separated by spaced-apart small dots 36 of insulative material. These dots or islands 36 are normally arranged in a uniform manner; however, a non-uniform distribution is within the scope of this invention. Further, the dots 36 can be arranged in a rectangular array, or in a non-rectangular array as shown in U.S. Pat. No. 5,220,136. In the present invention the maximum spacing between the dots 36 is governed only by the need to prevent inadvertent contact between the conductive layer portions 20, 20A and the resistive layer 10. The dots 36 may be applied to either the layer 10 or the conductive layers 20, 20A, or to both surfaces.

Through the use of the multiplicity of conductive layer portions 20, 20A (or other combinations), some portions of the touchscreen can be made "active" while other portions are made "inactive" through operation of the switch means 26. This will permit, for example, the use of a stylus of some type as for writing on one portion (e.g., 20) without the portion of the hand holding the stylus (which rests on portion 20A) registering at all on the touchscreen. Since spacing of the dot insulators 36 can be larger, because area discrimination has been accomplished by the separate portions, the dot insulators 36 do not interfere with writing since fewer dot insulators 36 are encountered. Of course, the entire touchscreen can be made active by proper operation of the switch means 26. As an example, the operation of the switch may be controlled by the use of a stylus "tethered" to the system. When the stylus is placed in a holder designed for that purpose, switch 26 is closed and the entire screen is active. When the stylus is removed, switch 26 is opened and only region 20 of the touchscreen remains active. This function is coordinated with the rest of the system operation such that appropriate indication of the use of only region 20 is signalled when the stylus is removed from the holder.

Figure 2:
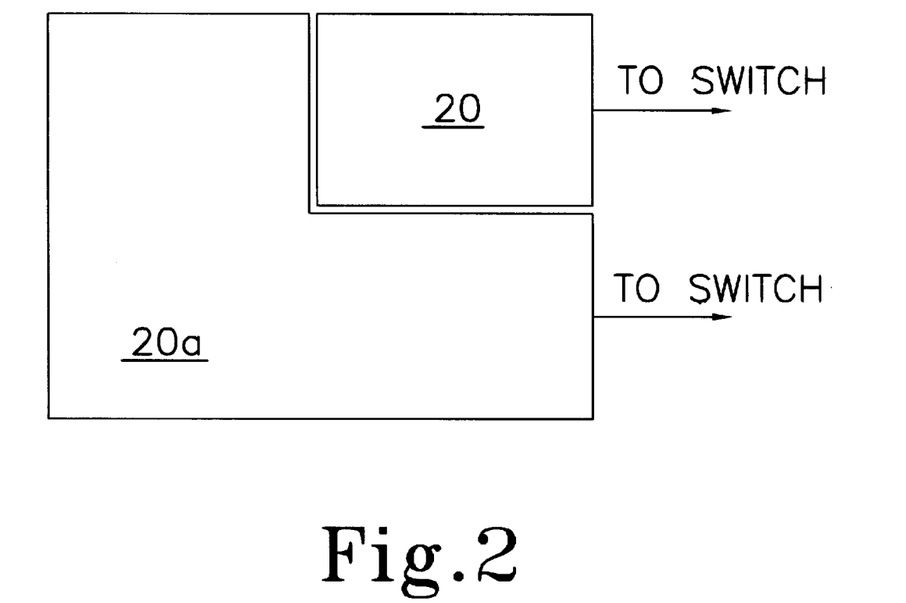
FIG. 2 is a plan view illustrating a coversheet of a touchscreen illustrated in FIG. 1 for the present invention having a different embodiment than that illustrated in FIG. 1.
Figure 3:
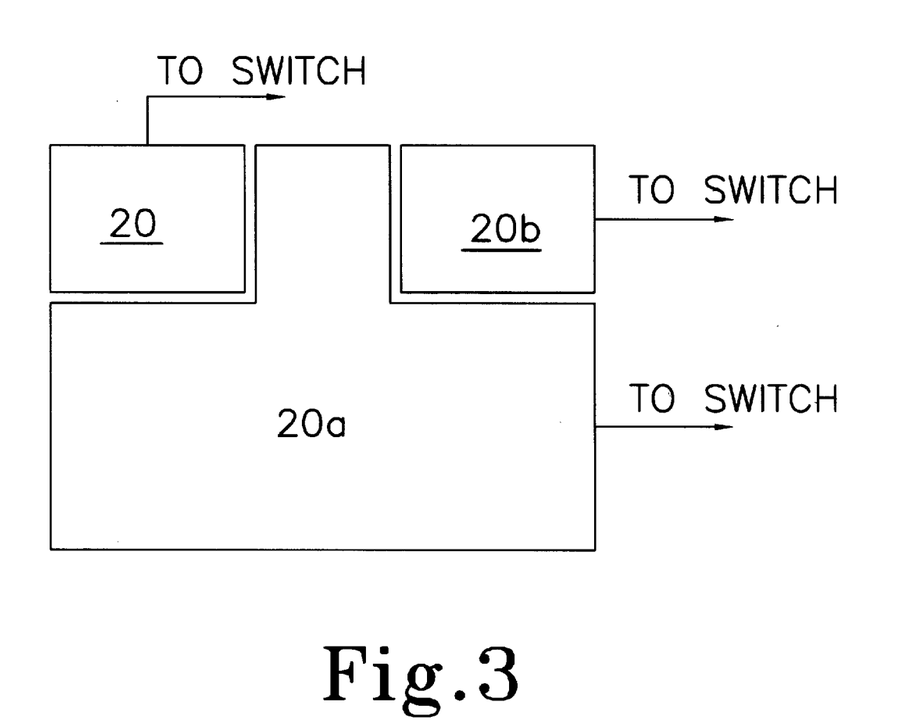
FIG. 3 is a plan view illustrating a coversheet of a touchscreen illustrated in FIG. 1 for the present invention having a further embodiment.

The configuration of the conductive portions 20, 20A is not limited to that illustrated in FIG. 1. For example, they can have a configuration as illustrated in FIG. 2. Further, there is no restriction as to the number of separate conductive portions. This is illustrated in FIG. 3 where there are three conductive portions 20, 20A, and 20B. Thus any number of conductive portions of any configuration can be utilized within the scope of the present invention. Each would be connected (or disconnected) by an appropriate switch means 26 to the circuitry 14 so as to select any one, any combination, or all of the portions of the touchscreen covered by the conductive portions to be made sensitive ("active") to a touch. Because the local resistivity of the conductive layer of the touchscreen has negligible effect on the linearity of the touchscreen, the discrete nature of the conductive regions 20, 20A (or 20B, etc.) does not affect the linearity of the device as a whole. Generally the calibration of the system is accomplished when all conductive portions are active; however, this may not be necessary depending on the specific locations of the conductive portions.

Figures 4, 4A:
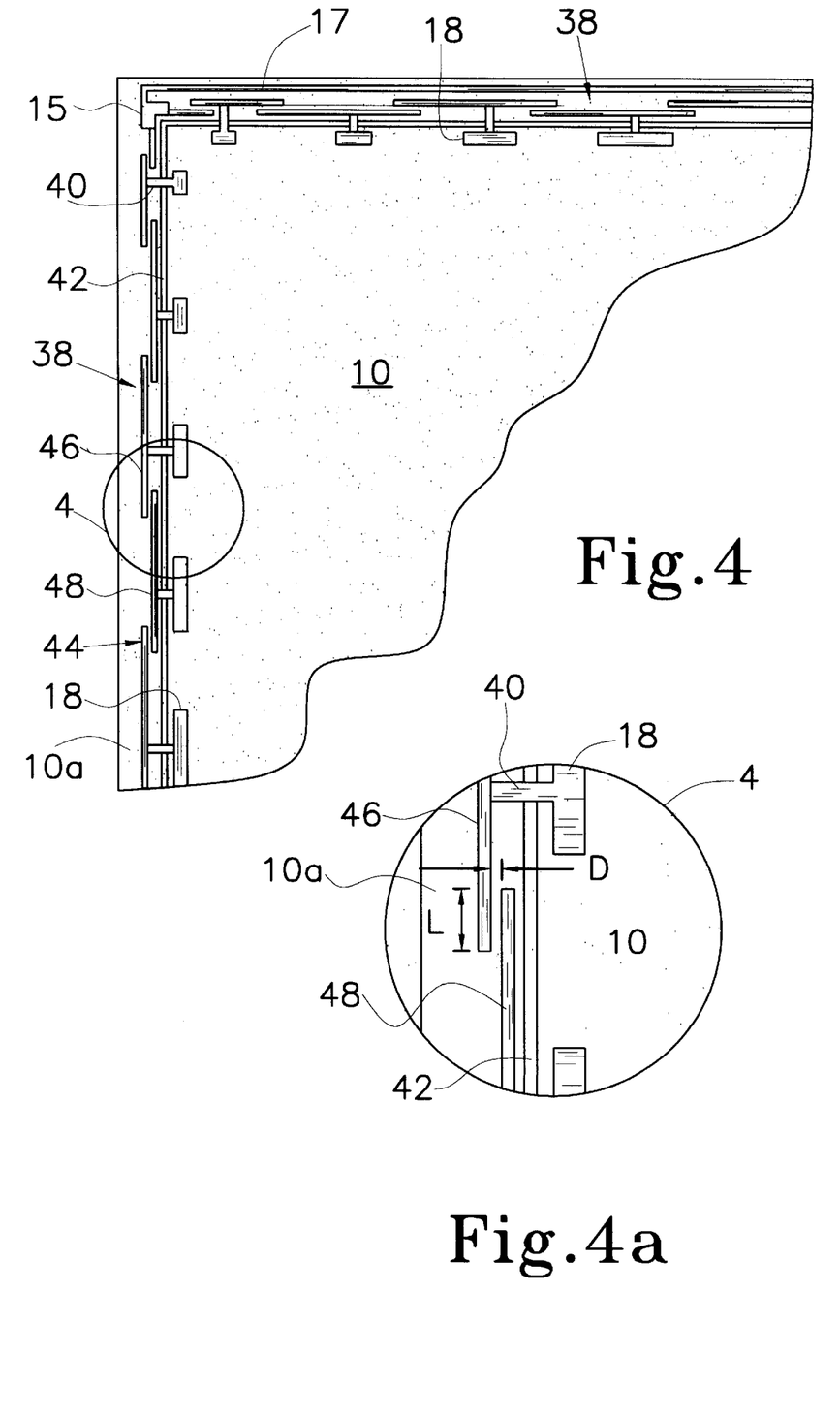
FIGS. 4 and 4A are illustrations of a preferred form of resistor network/electrode configuration for introducing fields into a single layer of a resistor-type touchscreen of the type illustrated in FIG. 1.

Although any of the known systems for producing the orthogonal or position discriminating fields in the resistive layer are useful for the present invention, a preferred system is that illustrated in FIGS. 4 and 4A (see U.S. Pat. No. 4,731,508). Some of the components are enlarged in order to properly distinguish them in these drawings. In this embodiment, the resistive surface 10 extends substantially over the entire sensor. A resistance member 16 around the perimeter of the resistive layer 10 is made up of four resistance element segments 38 (one along each edge of the perimeter, but only two shown) each consisting of a plurality of resistors. Where resistance element segments 38 join at corners 15 of the resistive layer 10, a connector 17 is provided for connection to the voltage in the circuitry 14.

Conductive electrodes 18 attached to the resistive layer 10 are positioned along each edge, with each electrode being joined to an adjacent resistance element with a conductive connector or lead 40. As discussed in the prior art (U.S. Pat. Nos. 4,731,508 and 4,822,957) the spacing and effective lengths of the electrodes 18 are selected to produce a voltage gradient at each electrode to compensate for any voltage drop that occurs along the resistance segments 38 perpendicular to current flow in the resistive layer 10.

A method of preventing undesirable current flow between the resistance segments 38 to the electrodes 18 is to form a line of discontinuity where there is no resistive coating between the resistance segments and the electrodes. As illustrated at 42 (see particularly FIG. 4A), this produces a central resistive area 10 and a peripheral resistive area 10A, preferably having the same resistivity. This can be accomplished by either not depositing any resistive coating along that line 42 or removing the coating after application. In either case the leads 40 span the line 42 so as to connect the electrodes 18 with the resistive segments 38.

Within each of these resistance segments 38 there is a plurality of discontinuous units 44, with one such unit between each electrode lead 40. Each of these units 44 is formed by a pair of overlapping conductive legs, as at 46, 48. These legs overlap a length, L, and are spaced apart a distance, D, (see FIG. 4A). The resistance produced for each unit 44 is a function of the spacing, D, the overlap length, L, and the resistance value of the resistive layer 10A. There is no critical location for the unit 44 between the electrodes 18 as long as the resistance value of each unit 44 is correct. Fine tuning of the resistance value of each unit 44 can be achieved by shortening or lengthening one or both of the legs 46, 48 to change the overlap length, L.

Assuming a touchscreen to be utilized for signature recognition, annotation, drawing or any other purpose which may require the user to input continuously varying positional data, the portion covered by conductive portion 20 (see FIG. 1) is made active by the switch means 26. The operation of the switch means 26 also makes the conductive portion 20A inactive. Thus, writing or other input can proceed over portion 20 to obtain position information by the circuitry 14 without any input from portion 20A. Thus, the palm, the edge or the heel of the hand which rests on portion 20A provides no input to the circuitry 14, thus there is the desired discrimination. Of course, since if one or more portion is not active, it will not respond to touch by an object of any size even as small as that in contact with the active portion. If the entire touchscreen is needed for position determination, the switch means 26 can be activated to a condition so that both conductive portions 20, 20A are connected to the circuitry 14.

It will be understood that similar operations can be achieved using a touchscreen having additional or differently shaped conductive portions, as in FIGS. 2 and 3. Obviously, the invention is not limited to just two or three conductive portions.

Figure 5:
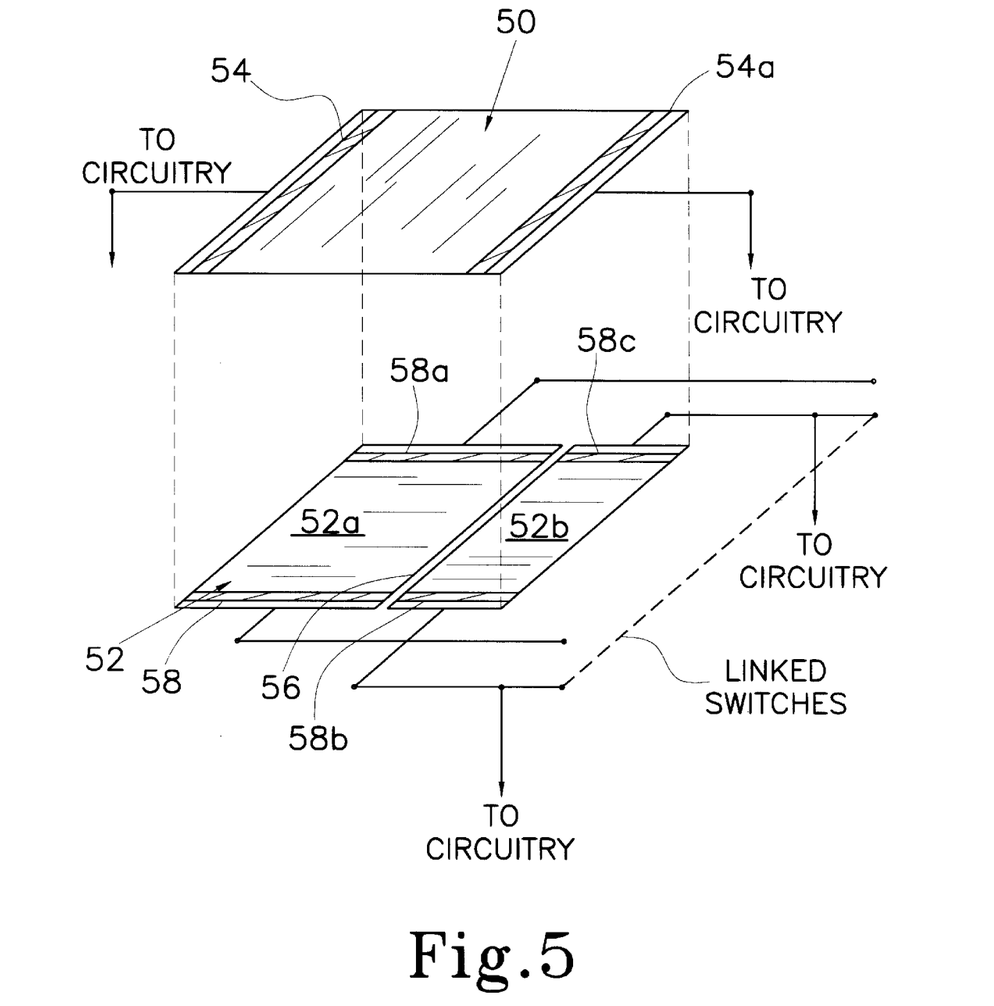
FIG. 5 is an exploded view of another type of resistive touchscreen illustrating the present invention to provide discrimination.

Another conventional type of resistive touchscreen to which the present invention is applicable is illustrated in the exploded view of FIG. 5. This type of touchscreen utilizes a pair of confronting resistive layers 50, 52. The layers 50, 52 are typically separated by dot separators (not shown). Electrical potentials are applied to layer 50 with edge electrodes 54, 54A. Layer 52 is divided into two portions 52A and 52B by an insulating line 56 in a manner similar to that illustrated in FIGS. 1–3. Accordingly, electrical potentials are applied to layer 52 through edge electrodes 58, 58A, 58B, and 58C.

As discussed below, layer 50 can similarly divided into separate portions (see FIG. 6). As will be known by persons skilled in the art, the various edge electrodes are connected to circuitry (not shown but of the type utilized for the embodiment of FIG. 1) whereby the appropriate voltages are fed to the electrodes to provide the electrical potentials in proper orientation and timed sequence. In a manner similar to that utilized for FIGS. 1–3, the separate resistive layer portions 52A and 52B are connected to linked switches shown in FIG. 5 to cause the portions to be active or inactive to achieve any desired touch discrimination. It will be understood that the resistive layer 52 can be divided into a greater number of portions, also.

Figure 6:
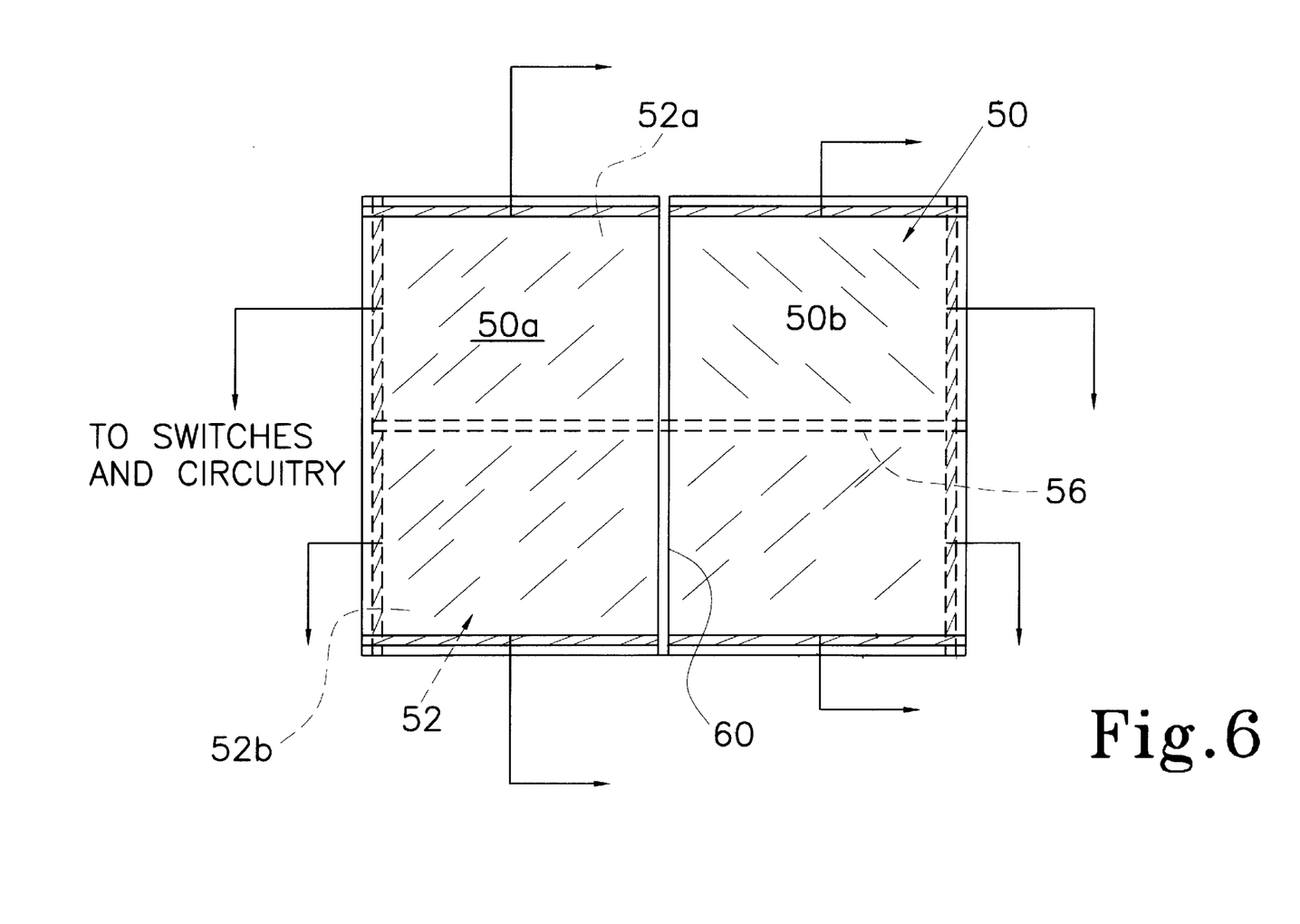
FIG. 6 is a plan view illustrating both layers of a resistive touchscreen as illustrated in FIG. 5 employing the present invention providing regions of discrimination similar to that of FIG. 2.

Referring to FIG. 6, this is a plan view illustrating how the two resistive layers 50, 52 can each be divided. The under resistive layer 52 is illustrated as being oriented orthogonally with its illustration in FIG. 5. Thus, the insulative line 56 is across the figure to produce the two portions 52A, 52B. The upper resistive layer 50 is divided by an insulative line 60 into the two portions 50A, 50B. The edge electrodes of each layer 50, 52 are connected to the circuitry and switch means (not shown) for providing voltages to the electrodes in a desired timed sequence, and for selecting active and inactive portions of the total touchscreen. Both layers 50, 52 can be separated into any selected number of portions to provide a desired position discrimination.

From the foregoing, it will be understood by persons skilled in the art that improved touchscreens have been developed that permit discrimination between contact by different objects of any size in different portions. This is achieved by subdividing at least one of the contacting sheets into a selected plurality of portions, each portion connected to a switch means so as to be "activated" or "inactivated" for providing inputs to a circuitry for determining touch position on the touchscreen. Thus, the present invention is not another class of the touchscreen/switch combinations described in the prior art. Rather, it is a whole new category of touchscreens.

Although specific embodiments have been described for use of the present invention, this is not for the purpose of limiting the invention. Rather, the invention is to be limited only by the appended claims and their equivalents.

I claim:

1. A resistive position touchscreen for providing information as to a point of touch by an object, and selectively discriminating against contact of other objects, said resistive position touchscreen comprising:

first and second closely spaced and separated sheets, said first and second sheets contacting each other at a point when touched by an object at that point, at least one of said first and second sheets divided into a plurality of electrically separated regions;

a resistive layer applied to at least one of said first and second sheets on a surface facing another of said first and second sheets, said resistive layer having a selected substantially uniform resistivity throughout said resistive layer;

field generating means connected to opposite edges of said resistive layer for producing electrical fields in said resistive layer;

a circuit means for applying voltages in proper timed sequence to said field generating means, and for receiving and analyzing signals from said plurality of separated regions to ascertain information as to a point of touch; and a switch means connected to each of said separated regions to selectively connect at least one of said separated regions with said circuit means whereby a selected portion of said resistive layer is active for providing information as to the position of touch of the object.

2. The touchscreen of claim 1 wherein a first resistive layer and a second resistive layer are applied to confronting surfaces of said first and second sheets, respectively, each said first and second resistive layers having a substantially uniform resistivity throughout; and wherein said field generating means is connected to opposite edges of said first resistive layer on said first sheet and to opposite edges of said second resistive layer on said second sheet to effectively provide intersecting electrical fields in said resistive position touchscreen in a selected alternating timed sequence.

3. The touchscreen of claim 1 wherein said resistive layer is applied to said first sheet, said second sheet having a conductive layer confronting said resistive layer, said conductive layer being divided into said plurality of electrically separated regions; and wherein said field generating means is connected to both opposite edges of said resistive layer to provide within said resistive layer alternating intersecting electrical fields in a selected time sequence.

4. The touchscreen of claim 2 wherein said first resistive layer is divided into said plurality of electrically separated regions.

5. The touchscreen of claim 2 wherein said first resistive layer and said second resistive layer are each divided into said plurality of electrically separated regions.

6. A resistive touchscreen for providing information as to a point of touch by an object, and selectively discriminating against contact of other objects, said resistive touchscreen comprising:

a resistive layer having a selected substantially uniform resistivity throughout said resistive layer, said resistive layer defining perimeter edges;

field generating means connected proximate said perimeter edges of said resistive layer for producing intersecting orthogonal electrical fields in said resistive layer;

a conductive layer overlaying and uniformly spaced from said resistive layer for contacting said resistive layer when touched by the object, said conductive layer divided into a plurality of electrically separated conductive regions;

a circuit means for applying voltages in proper timed sequence to said field generating means, and for receiving and analyzing signals from said plurality of conductive regions to ascertain the information as to the point of touch; and a switch means connected to each of said conductive regions to selectively connect at least one of said conductive regions with said circuit means whereby a portion of said resistive layer associated with said connected conductive region is active for providing information at said circuit means as to the position of a touch of the object to said connected conductive region, and whereby portions of said resistive layer associated with conductive regions not attached by said switch means to said circuit means are inactive as to providing position information.

7. The resistive touchscreen of claim 6 further comprising insulator means for preventing inadvertent contact between said conductive layer and said resistive layer.

8. The resistive touchscreen of claim 7 wherein said insulator means is a plurality of substantially uniformly distributed insulator islands positioned between said conductive regions and said resistive layer, said insulator islands having a height sufficient to prevent said inadvertent contact, and allow contact when said conductive layer is touched by the object.

9. The resistive touchscreen of claim 6 wherein said resistive layer is supported by a substrate layer.

10. The resistive touchscreen of claim 6 wherein said field generating means comprises:

a plurality of resistance elements one each being positioned proximate each of said perimeter edges of said resistive layer, each of said plurality of resistance elements having opposite ends joined to proximate ends of adjoining resistance elements, each of said plurality of resistance elements comprising a plurality of discontinuous units in electrical contact with said resistive layer, each of said units formed by at least one line of conductive material spaced from a line of conductive material of an adjacent unit to define a separation gap of a selected width and length whereby said width and length of said gap and said resistivity of said resistive layer establish a unit resistance for said units;

connection elements at said joined ends of said plurality of resistance elements connected to said circuit means for applying voltage to said joined ends; and a plurality of electrodes positioned on, and electrically connected to, said resistive layer along a preselected symmetrical path proximate each perimeter edge of said resistive layer, said electrodes each being connected to selected positions along each of said plurality of resistance elements to introduce said orthogonal electric fields in said resistive layer, said electrodes having a selected spacing and each electrode having an effective length along said path to produce a selected voltage gradient at each of said electrodes to compensate for any cumulative voltage drop along said resistance element perpendicular to current flow through said resistive layer during operation of said resistive touchscreen when said orthogonal electric fields are introduced into said resistive layer.

11. A resistive touchscreen for providing information as to a point of touch by an object, and selectively discriminating against contact of other objects, said resistive touchscreen comprising:

a substrate;

a resistive coating applied to a surface of said substrate, said resistive coating having a selected substantially uniform resistivity throughout said resistive coating, said resistive coating defining perimeter edges;

field generating means connected proximate said perimeter edges of said resistive coating for producing orthogonal electrical fields in said resistive coating;

a conductive layer overlaying and uniformly spaced from said resistive coating for contacting said resistive coating when touched by the object, said conductive layer divided into a plurality of electrically separated conductive regions;

insulator means for preventing inadvertent contact between said conductive layer and said resistive coating;

a circuit means for applying voltages in proper time sequence to said field generating means, and for receiving and analyzing signals from said plurality of conductive regions to ascertain the information as to the point of touch; and a switch means connected to each of said conductive regions to selectively connect at least one of said conductive regions with said circuit means whereby a portion of said resistive coating associated with said connected conductive region is active for providing information at said circuit means as to the position of a touch of the object to said connected conductive region, and whereby portions of said resistive coating associated with conductive regions not attached by said switch means to said circuit means are inactive as to providing position information.

12. The resistive touchscreen of claim 11 wherein said field generating means comprises:

a plurality of resistance elements one each being positioned proximate each of said perimeter edges of said resistive layer, each of said plurality of resistance elements having opposite ends joined to proximate ends of adjoining resistance elements, each of said plurality of resistance elements comprising a plurality of discontinuous units in electrical contact with said resistive coating, each of said units formed by at least one line of conductive material spaced from a line of conductive material of an adjacent unit to define a separation gap of a selected width and length whereby said width and length of said gap and said resistivity of said resistive coating establish a unit resistance for said units;

connection elements at said joined ends of said plurality of resistive elements connected to said circuit means for applying voltage to said joined ends; and a plurality of electrodes positioned on, and electrically connected to, said resistive coating along a preselected symmetrical path proximate each perimeter edge of said resistive coating, said electrodes each being connected to selected positions along said plurality of resistance elements to introduce said orthogonal electric fields in said resistive coating, said electrodes having a selected spacing and each electrode having an effective length along said path to produce a selected voltage gradient at each of said electrodes to compensate for any cumulative voltage drop along said resistance element perpendicular to current flow through said resistive coating during operation of said resistive touchscreen when said orthogonal electric fields are introduced into said resistive coating.

13. A resistive touchscreen for providing information as to loci of points along a line of touch by a hand-held object, and selectively discriminating against contact of other objects, said resistive touchscreen comprising:

a substrate;

a resistive coating applied to a surface of said substrate, said resistive coating having a selected substantially uniform resistivity throughout said resistive coating, said resistive coating defining perimeter edges;

field generating means connected proximate said perimeter edges of said resistive coating for producing orthogonal electrical fields in said resistive coating;

a conductive layer overlaying and uniformly spaced from said resistive coating for contacting said resistive coating when touched by the object, said conductive layer divided into a plurality of electrically separated conductive regions, at least one of said regions for receiving the line of touch by the hand-held object and at least one region for supporting the hand;

insulator means for preventing inadvertent contact between said conductive regions and said resistive coating;

a circuit means for applying voltages in proper time sequence to said field generating means, and for receiving and analyzing signals from said plurality of conductive regions to ascertain the information as to the loci of points of the touch; and a switch means connected to each of said conductive regions to selectively connect at least one of said conductive regions with said circuit means whereby a portion of said resistive coating associated with said connected conductive region is active for providing information at said circuit means as to the loci of points of the touch of the object to said connected conductive region, and whereby portions of said resistive coating associated with conductive regions not attached by said switch means to said circuit means are inactive as to providing position information to discriminate against touch of the hand.

14. The resistive touchscreen of claim 13 further comprising insulator means for preventing inadvertent contact between said conductive layer and said resistive coating.

15. The resistive touchscreen of claim 14 wherein said insulator means is a plurality of substantially uniformly distributed insulator islands positioned between said conductive regions and said resistive coating, said insulator islands having a height sufficient to prevent said inadvertent contact, and allow contact when said conductive layer is touched by the object.

16. The resistive touchscreen of claim 13 wherein said field generating means comprises:

a plurality of resistance elements one each being positioned proximate each of said perimeter edges of said resistive coating, each of said plurality of resistance elements having opposite ends joined to proximate ends of adjoining resistance elements, each of said plurality of resistance elements comprising a plurality of discontinuous units in electrical contact with said resistive coating, each of said units formed by at least one line of conductive material spaced from a line of conductive material of an adjacent unit to define a separation gap of a selected width and length whereby said width and length of said gap and said resistivity of said resistive coating establish a unit resistance for said units;

connection elements at said joined ends of said plurality of resistive elements connected to said circuit means for applying voltage to said joined ends; and a plurality of electrodes positioned on, and electrically connected to, said resistive coating along a preselected symmetrical path proximate each perimeter edge of said resistive coating, said electrodes each being connected to selected positions along said plurality of resistance elements to introduce said orthogonal electric fields in said resistive coating, said electrodes having a selected spacing and each electrode having an effective length along said path to produce a selected voltage gradient at each of said electrodes to compensate for any cumulative voltage drop along said resistance element perpendicular to current flow through said resistive coating during operation of said resistive touchscreen when said orthogonal electric fields are introduced into said resistive coating.

17. A resistive position touchscreen for providing information as to a point of touch by an object, and selectively discriminating against contact of other objects, said resistive touchscreen comprising:

a first resistive layer having a selected substantially uniform resistivity throughout said first resistive layer, said first resistive layer defining perimeter edges;

a second resistive layer closely spaced from said first resistive layer, said second resistive layer having a selected substantially uniform resistivity throughout said second resistive layer of a value corresponding to said resistivity of said first resistive layer, said second resistive layer defining perimeter edges, at least one of said first and second resistive layers divided into a plurality of electrically separated regions;

electrical field generating means connected proximate opposite of said perimeter edges of said first and second resistive layers for producing intersecting electrical fields in said resistive touchscreen in alternating timed sequence;

a circuit means for applying voltages in proper timed sequence to said field generating means, and for receiving and analyzing signals from said plurality of separated regions to ascertain the information as to the point of touch; and a switch means connected to each of said electrically separated regions to selectively connect at least one of said separated regions with said circuit means whereby a portion of said at least one of said first and second resistive layers associated with said connected separated region is active for providing information at said circuit means as to the position of a touch of the object to said connected separated region, and whereby portions of said at least one of said first and second resistive layers associated with separated regions not attached by said switch means to said circuit means are inactive as to providing position information.

18. The resistive touchscreen of claim 16 wherein said first and second resistive layers are separated with a plurality of substantially uniformly distributed insulator islands, said insulator islands having a height sufficient to prevent inadvertent contact between said first and second resistive layers, and allow contact when one of said resistive layers is touched by the object.

19. The resistive touchscreen of claim 16 wherein said field generating means comprises:

a first pair of electrodes in electrical contact with said first resistive layer at opposite of said perimeter edges;

a second pair of electrodes in electrical contact with said second resistive layer at opposite of said perimeter edges, said second pair of electrodes being orthogonally arranged with respect to said first pair of electrodes; and connections from said first and second pair of electrodes to said circuit means to receive voltages in a selected timed sequence to produce electrical fields in said first and second resistor layers that are intersecting with respect to each other.

20. The touchscreen of claim 17 wherein both of said first and second resistive layers are divided into a plurality of electrically separated regions, electrodes of each said separated regions connected to said circuit means.

* * * * *